US012435050B2

(12) United States Patent
Martelletti et al.

(10) Patent No.: US 12,435,050 B2
(45) Date of Patent: Oct. 7, 2025

(54) BENAZOLIN-CHOLINE AND ITS USE IN THE AGROCHEMICAL FIELD

(71) Applicant: BAYER AKTIENGESELLSCHAFT, Leverkusen (DE)

(72) Inventors: Arianna Martelletti, Sulzbach im Taunus (DE); Lothar Lorentz, Waldbröl (DE); Udo Bickers, Cologne (DE); Uwe Döller, Rodgau (DE); Lothar Willms, Hillscheid (DE)

(73) Assignee: BAYER AKTIENGESELLSCHAFT, Leverkusen (DE)

( * ) Notice: Subject to any disclaimer, the term of this patent is extended or adjusted under 35 U.S.C. 154(b) by 807 days.

(21) Appl. No.: 17/634,822

(22) PCT Filed: Aug. 10, 2020

(86) PCT No.: PCT/EP2020/072354
§ 371 (c)(1),
(2) Date: Feb. 11, 2022

(87) PCT Pub. No.: WO2021/028375
PCT Pub. Date: Feb. 18, 2021

(65) Prior Publication Data
US 2022/0324822 A1    Oct. 13, 2022

(30) Foreign Application Priority Data
Aug. 13, 2019    (EP) ..................................... 19191403

(51) Int. Cl.
| | | |
|---|---|---|
| *A01P 13/00* | (2006.01) | |
| *A01N 43/78* | (2006.01) | |
| *C07D 277/68* | (2006.01) | |

(52) U.S. Cl.
CPC ........... *C07D 277/68* (2013.01); *A01N 43/78* (2013.01); *A01P 13/00* (2021.08)

(58) Field of Classification Search
CPC ......... A01P 13/00; A01P 13/02; A01P 21/00; A01P 3/00
See application file for complete search history.

(56) References Cited

U.S. PATENT DOCUMENTS

| | | | |
|---|---|---|---|
| 4,032,320 A | 6/1977 | Lush | |
| 5,175,353 A | 12/1992 | Jones et al. | |
| 5,266,553 A | 11/1993 | Champion et al. | |
| 5,550,224 A | 8/1996 | Hazen | |
| 5,874,096 A | 2/1999 | Hazen | |
| 6,391,962 B2 | 5/2002 | Zerrer et al. | |
| 8,563,473 B2 | 10/2013 | Stagg et al. | |
| 2008/0207452 A1 | 8/2008 | Kramer et al. | |
| 2019/0133116 A1 | 5/2019 | Liu et al. | |

FOREIGN PATENT DOCUMENTS

| | | | | |
|---|---|---|---|---|
| CA | 1293974 C | * | 1/1992 | ........... C07C 69/736 |
| DE | 36 00 996 | | 7/1987 | |
| EP | 0 041 787 | | 12/1981 | |
| EP | 0 022 317 | | 9/1983 | |
| EP | 0 375 624 | | 2/1995 | |
| EP | 2 560 494 | | 2/2013 | |
| GB | 862 226 | | 3/1961 | |
| GB | 1 243 006 | | 10/1968 | |
| WO | WO 92/21656 | | 12/1992 | |
| WO | WO 2007/031438 | | 3/2007 | |
| WO | WO2008106107 A1 | * | 9/2008 | ............. A01P 13/00 |
| WO | WO 2010/151622 | | 12/2010 | |
| WO | WO 2011/019652 | | 2/2011 | |
| WO | WO 2011/039172 | | 4/2011 | |
| WO | WO 2012/064370 | | 5/2012 | |
| WO | WO 2012/113830 | | 8/2012 | |
| WO | WO 2013/189773 | | 12/2013 | |
| WO | WO 2017/027250 | | 2/2017 | |
| WO | WO 2018/197418 | | 11/2018 | |

OTHER PUBLICATIONS

PCT International Preliminary Report on Patentability dated Feb. 8, 2022, PCT/EP2020/072354.

* cited by examiner

*Primary Examiner* — Audrea B Coniglio
*Assistant Examiner* — Audrea Buckley
(74) *Attorney, Agent, or Firm* — Harness, Dickey & Pierce, P.L.C.

(57) ABSTRACT

The present invention relates to the technical field of crop protection. More specifically, the present invention relates to benazolin-choline and to compositions (formulations) comprising benazolin-choline. The invention also relates to methods of manufacturing benazolin-choline and compositions comprising benazolin-choline as well as uses thereof.

33 Claims, No Drawings

BENAZOLIN-CHOLINE AND ITS USE IN THE AGROCHEMICAL FIELD

CROSS-REFERENCE TO RELATED APPLICATIONS

This application is a U.S. national stage filing under 35 U.S.C. § 371 of International Application No. PCT/EP2020/072354, filed on Aug. 10, 2020, which claims the benefit of and priority to European Application No. 19191403.5, filed on Aug. 13, 2019. The entire disclosure of each of the above applications is incorporated herein by reference.

The present invention relates to the technical field of crop protection. More specifically, the present invention relates to benazolin-choline and to compositions (formulations) comprising benazolin-choline. The invention also relates to methods of manufacturing benazolin-choline and compositions comprising benazolin-choline as well as uses thereof.

Crop protectant compositions can be formulated in many different ways, with the possibility of the characteristics of the active ingredients and the nature of the formulation giving rise to problems in terms of stability, efficacy, and applicability of the formulations. Moreover, certain formulations are more advantageous on economic and environmental grounds than others.

The performance properties of water-based pesticide formulations frequently depend on a large number of variable parameters, making it impossible to simply select components of known systems and to combine them with the active ingredients intended for new combinations or formulations, if the resultant composition is to be biologically highly active, stable on storage, and ideal from the application standpoint.

In addition, off-site movement is commonly associated with acid forms of carboxylic acid herbicides like dicamba or 2,4-D and other auxin herbicides due to their volatility. Auxinic carboxylic acid herbicides are often converted into liquid formulations by conversion into water soluble salts or solubilized esters. The ester formulations can be more effective than the salt ones, on an acid equivalent basis, in the control of unwanted vegetation, but also have the undesired characteristic under certain conditions of application, to migrate from the application site to adjacent desirable vegetation or adjacent crop plants, such as soybeans and cotton, where contact damage to sensitive plants can occur.

Off-site movement is a known problem of spray formulations containing salts of volatile auxin herbicides like dicamba. Under certain conditions of application, dicamba can migrate from the application site to adjacent crop plants.

Various strategies have been suggested to reduce off-site movement of volatile auxin herbicides like dicamba, including formulating the auxin herbicides in the form of certain mineral or amine salts, encapsulation with a polymeric coating, and complexing with a polybasic polymer.

The following technical suggestions have for example been reported:

U.S. Pat. No. 5,266,553 discloses a method of manufacturing a dry herbicidal salt composition comprising a water-soluble salt of an herbicidal compound, wherein the herbicidal compound includes a carboxylic acid functionality, like a substituted benzoic acid herbicide or a phenoxy-substituted carboxylic acid herbicide.

EP 2 560 494 and U.S. Pat. No. 8,563,473 concern aqueous herbicidal concentrates comprising a salt of an auxinic carboxylic acid using the N,N,N-trimethylethanol ammonium cation as the ammonium salt of the auxinic carboxylic acid and the use of a choline salt of an auxinic carboxylic acid herbicide for preparing aqueous concentrates having reduced eye irritancy.

WO 2012/113830 teaches the use of choline chloride in a formulation comprising a least one agrochemical active ingredient, as a bio-activator to increase the penetration of said agrochemical active ingredient in a plant.

WO 2011/019652 concerns aqueous herbicidal solution concentrate formulations comprising an auxin herbicide component consisting essentially of auxin herbicide salts and comprising a certain minimum amount of dicamba monoethanolamine salt.

WO 2010/151622 relates to herbicidal concentrate compositions containing potassium or certain amine salts of glyphosate and dicamba.

EP 0 375 624 discloses low volatility amine salts of pesticides, wherein for example as suitable amines N-aminopropylmorpholine, methyldiethanolamine, 2-aminoethyl-1,3-propanediol, tris(hydroxymethyl)aminomethane or 2,4,6-tris(dimethylaminomethyl)phenol are mentioned.

U.S. Pat. No. 5,175,353 discloses a low volatility 2-(2-aminoethoxy)-ethanol salt of herbicides like dicamba.

WO 92/21656 discloses aminoalkylpyrrolidone salts of pesticides comprising an acidic hydrogen.

US 2008/0207452 teaches ionic liquids formed by combining a carboxylic acid herbicide with certain trialkylamines or heteroarylamines which are—on herbicidal activity on acid equivalent basis—at least as active as commercially used carboxylic acid herbicide salts, but are less volatile.

WO 2011/039172 discloses certain low volatile polyamine salts of anionic pesticides, e.g. the N,N-bis-(3-aminopropyl)methylamine salt of dicamba.

WO 2013/189773 relates to aqueous composition comprising dicamba and certain drift control agents.

WO 2017/027250 discloses compositions comprising (a) a non-pesticide choline salt as water conditioning component, and (b) at least one pesticide, preferably auxinic herbicides like dicamba.

WO 2018/197418 pertains to highly concentrated solutions of alkanolamine salts of dicamba.

U.S. Pat. Nos. 5,550,224, 5,874,096, 6,391,962, WO 2007/031438 and WO 2012/064370 each disclose agricultural compositions with drift control agents based on certain polymers, e.g. guar (derivatives) or certain other polymers.

US 2019/0133116A1 discloses pesticide compositions comprising an auxin herbicide and a built-in fatty acid based drift control agent.

In view of the known compositions, the objective of the present invention was to provide a material or substance with further improved properties, in particular regarding herbicidal activity, reduced volatility and/or formulation compatibility, in each case alone or in combination with other herbicides or herbicidal formulations. There is in particular a need for highly concentrated herbicidal compositions containing dicamba that can be economically produced while having sufficient stability and that can be diluted to provide effective spray formulation solutions for application to unwanted vegetation.

It has now been surprisingly found that benazolin-choline is a substance having such improved properties.

The invention therefore primarily relates to benazolin-choline which has the following structure

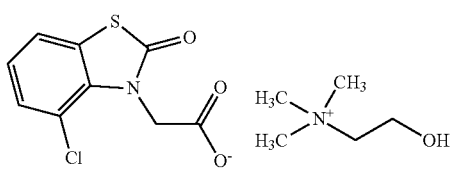

Benazolin-choline is a composed of the benazolin anion and the N,N,N-trimethylethanolammonium (=choline) cation.

Benazolin-choline of the present invention and the compositions containing benazolin-choline exhibit improved properties compared to other known benazolin forms, in particular known benazolin salts. In comparison to known benazolin salts, benazolin-choline shows improved herbicidal activity, is able to increase or enhance the herbicidal activity of other herbicides, has lower volatility, is able to reduce the volatility of other (volatile) herbicides and shows improved formulation compatibility.

In one aspect of the present invention stable and compatible herbicidal compositions containing benazolin-choline are provided that are relatively clear and do not appreciably separate into phases or form precipitates upon standing or storage. A stable and compatible herbicidal composition beneficially provides a uniform spray formulation solution upon dilution without the need for excessive agitation.

Benazolin and certain salts of benazolin are known form the prior art.

Benazolin (CAS name: 4-chloro-2-oxo-3(2H)-benzothiazoleacetic acid; CAS Reg. No. 3813-05-6, IUPAC name: 4-chloro-2-oxobenzothiazolin-3ylacetic acid) is an herbicide and also may be used as ester or salt, in particular benazolin-ethyl (CAS Reg. No. 25059-80-7), benazolin-dimethylammonium (CAS Reg. No. 38561-76-1) and benazolin-potassium (CAS Reg. No. 67338-65-2).

Benazolin is a synthetic auxin acting like indolylacetic acid. It is a selective (inter alia in cereals, soya beans and maize), systemic, growth-regulator herbicide, absorbed principally by the leaves and translocated readily throughout the plant in the phloem. Benazolin is used in post-emergence control (i.e. applied on weeds that have already emerged) of many annual broad-leaved weeds and is selective inter alia in cereals, soya beans and maize ("The Pesticide Manual" 16th Edition, British Crop Protection Council 2012, p. 77-79). Benazolin is less volatile compared to auxin herbicides like dicamba or 2,4-D.

GB 862 226 discloses 2-oxo-benzthiazoline derivatives, inter alia benazolin, and herbicidal compositions containing them.

Examples of 2-oxo-benzothiazoline derivatives and pharmaceutical compositions comprising such derivatives are known from EP 0 022 317.

U.S. Pat. No. 4,032,320 and GB 1 243 006 inter alia teach herbicidal compositions comprising benazolin (more specifically an alkali metal salt or ethyl ester of benazolin) and certain further herbicides, e.g. (an alkali metal salt of) dicamba and MCPA.

DE 36 00 996 pertains to herbicidal compositions containing a mixture of a biscarbamate and a salt or an ester of 4-chloro-2-oxobenzothiazolin-3-ylacetic acid, and to its use for the selective control of weeds in crop plants, especially in soybeans.

EP 0 041 787 relates to herbicidal compositions comprising benazolin or suitable salts or esters thereof, in particular benazolin-ethyl and benazolin-potassium salt, and certain dihalobenzonitriles.

Choline hydroxide (CAS Reg. No. 123-41-1) can be reacted with benazolin (CAS Reg. No. 3813-05-6) in water readily forming the choline salt of benazolin (benazolin-choline).

In one aspect, the present invention relates to a composition suitable for use in the agrochemical field comprising or consisting of (i) benazolin-choline, preferably in a total amount of from 0.25% to 80% by weight based on the total weight of the composition, and (ii) one or more constituents which are not herbicidal active crop protectant ingredient(s).

Furthermore, benazolin-choline of the present invention can be conveniently formulated as aqueous concentrates. Preferably, the compositions according to the present invention are liquid at 25° C. and 1013 mbar.

The invention therefore also relates to (preferably liquid) compositions comprising or consisting of (a) benazolin-choline, preferably in a total amount of from 0.25% to 60% by weight, and (b) water, preferably in a total amount of up to 99.75% by weight, in each case based on the total weight of the composition.

Further, the present invention relates to (preferably liquid) compositions comprising or consisting of
(a) benazolin-choline, and one or more further constituents selected from the group consisting of constituents (b) to (g):
(b) water,
(c) one or more further herbicides (i.e. different from constituent (a)),
(d) one or more safeners,
(e) one or more surface-active agents,
(f) one or more organic solvents,
(g) one or more other formulation adjuvants (i.e. different from constituents (b), (e) and (f).

Preferably, the present invention relates to (preferably liquid) compositions comprising or consisting of
(a) benazolin-choline,
(b) water, and optionally one or more further constituents selected from the group consisting of constituents (c) to (g):
(c) one or more further herbicides (i.e. different from constituent (a)),
(d) one or more safeners,
(e) one or more surface-active agents,
(f) one or more organic solvents,
(g) one or more other formulation adjuvants (i.e. different from constituents (b), (e) and (f).

Advantageously, in the compositions according to the present invention, the total amount by weight of constituent (a) to the total amount of constituent (b) is in the range of from 10:1 to 1:300, preferably in the range of from 2:1 to 1:200, more preferably in the range of from 1:1 to 1:100, even more preferably in the range of from 1:2 to 1:50.

In compositions according to the present invention, the total amount of constituent (a) advantageously in the range of from 0.5% to 40% by weight, preferably in the range of from 0.5% to 30%, more preferably in the range of from 1% to 25%, even more preferably in the range of from 5% to 20%, in each case based on the total weight of the composition.

A (preferably liquid) composition according to the present invention preferably comprises or consists of
constituent (a) in a total amount of from 0.5% to 30% by weight,
constituent (b) in a total amount of from 1% to 80% by weight,
and optionally one or more further constituents selected from the group consisting of constituents (c) to (g):

constituent (c) in a total amount of from 0% to 60% by weight,
constituent (d) in a total amount of from 0% to 15% by weight,
constituent (e) in a total amount of from 0% to 25% by weight,
constituent (f) in a total amount of from 0% to 20% by weight,
constituent (g) in a total amount of from 0% to 10% by weight,
in each case based on the total weight of the composition.

A preferred (and preferably liquid) composition according to the present invention comprises or consists of
constituent (a) in a total amount of from 0.5% to 30% by weight,
constituent (b) in a total amount of from 1% to 80% by weight,
and optionally one or more further constituents selected from the group consisting of constituents (c) to (g):
constituent (c) in a total amount of from 1% to 60% by weight,
constituent (d) in a total amount of from 0.25% to 15% by weight,
constituent (e) in a total amount of from 0.5% to 25% by weight,
constituent (f) in a total amount of from 0.25% to 20% by weight,
constituent (g) in a total amount of from 0.05% to 10% by weight,
in each case based on the total weight of the composition.

More preferred is a (and preferably liquid) composition according to the present invention comprising or consisting of
constituent (a) in a total amount of from 1% to 25% by weight,
constituent (b) in a total amount of from 2% to 60% by weight,
and optionally one or more further constituents selected from the group consisting of constituents (c) to (g):
constituent (c) in a total amount of from 5% to 50% by weight,
constituent (d) in a total amount of from 0.5% to 10% by weight,
constituent (e) in a total amount of from 1% to 20% by weight,
constituent (f) in a total amount of from 0.5% to 15% by weight,
constituent (g) in a total amount of from 0.1% to 7.5% by weight,
in each case based on the total weight of the composition.

Particularly preferred is a (preferably liquid) composition according to the present invention comprising or consisting of
constituent (a) in a total amount of from 5% to 20% by weight,
constituent (b) in a total amount of from 5% to 50% by weight,
and optionally one or more further constituents selected from the group consisting of constituents (c) to (g):
constituent (c) in a total amount of from 10% to 40% by weight,
constituent (d) in a total amount of from 1% to 5% by weight,
constituent (e) in a total amount of from 2% to 15% by weight,
constituent (f) in a total amount of from 1% to 10% by weight,
constituent (g) in a total amount of from 0.1% to 5% by weight,
in each case based on the total weight of the composition.

In a further aspect, the present invention relates to (preferably liquid) compositions comprising or consisting of
(a) benazolin-choline,
(b) water,
(c) one or more further herbicides (i.e. different from constituent (a)), and optionally one or more further constituents selected from the group consisting of constituents (d) to (g):
(d) one or more safeners,
(e) one or more surface-active agents,
(f) one or more organic solvents,
(g) one or more other formulation adjuvants (i.e. different from constituents (b), (e) and (f),
wherein the amounts by weight of constituents (a), (b) and (c) as well as of the optional constituents (d) to (g) for each of the constituents preferably are identical to the respective range indicated above of the preferred, more preferred or particularly preferred compositions.

In a further aspect, the present invention relates to (preferably liquid) compositions comprising or consisting of
(a) benazolin-choline,
(b) water,
(c) one or more further herbicides (i.e. different from constituent (a)),
(e) one or more surface-active agents, and optionally one or more further constituents selected from the group consisting of constituents (d), (f) and (g):
(d) one or more safeners,
(f) one or more organic solvents,
(g) one or more other formulation adjuvants (i.e. different from constituents (b), (e) and (f),
wherein the amounts by weight of constituents (a), (b), (c) and (e) as well as of the optional constituents (d), (f) and (g) for each of the constituents preferably are identical to the respective range indicated above of the preferred, more preferred or particularly preferred compositions.

The term "herbicidal active crop protectant ingredient(s)" used in the context of the present invention and the common names used herein are known to the skilled person and are preferably those mentioned in "The Pesticide Manual" 16th Edition, British Crop Protection Council 2012; these include the known stereoisomers (in particular racemic and enantiomeric pure isomers) and derivatives such as salts or esters, and particularly the commercially customary forms, and apply in particular in the context of constituents (c) and (d) of the compositions according to the present inventions.

To allow a high concentration in compositions according to the present invention of one or more active crop protectant ingredients as constituent (c), these active ingredients are preferably used in form of their salts since these generally speaking show higher water solubility.

The compositions according to the present invention preferably comprise as constituent (c) one or more crop protectant ingredients selected from the group consisting of glufosinate [2-amino-4-[hydroxy(methyl)phosphinoyl]butanoic acid] and salts thereof, glyphosate [N-(phosphonomethyl)glycine] and salts thereof, auxin herbicides and salts thereof.

The compositions according to the present invention preferably comprise as constituent (c) one or more further herbicides (i.e. different from constituent (a)) as constituent (c) selected from the group consisting of glufosinate and salts thereof, glyphosate and salts thereof, and auxin herbicides and salts thereof. The auxin herbicides preferably are selected from benzoic acid herbicides (preferably chloramben, dicamba, 2,3,6-TBA and tricamba), picolinic acid herbicides (preferably aminopyralid, clopyralid, picloram, halauxifen (4-amino-3-chloro-6-(4-chloro-2-fluoro-3-methoxyphenyl)picolinic acid), florpyrauxifen (4-amino-3-chloro-6-(4-chloro-2-fluoro-3-methoxyphenyl)-5-fluoropicolinic acid), pyridinyloxyacetic acid herbicides (preferably triclopyr and fluoroxypyr), quinolinecarboxylic acid herbicides (preferably quinclorac and quinmerac), phenoxyacetic acid herbicides (preferably 4-CPA, 2,4-D, 3,4-DA and MCPA), phenoxybutyric herbicides (preferably 4-CPB, 2,4-DB, 3,4-DB and MCPB), phenoxypropionic herbicides (preferably cloprop, 4-CPP, dichlorprop, 3,4-DP, fenoprop, mecoprop and mecoprop-P) and salts of these auxin herbicides.

Also regarding volatility aspects, the combination of benazolin-choline of the present invention with one or more volatile herbicidal auxinic carboxylic acids or salts thereof as constituent (c) of the compositions according to the present invention is very beneficial.

Volatile herbicidal auxinic carboxylic acids (i.e. the free acids) in the context of the present invention are considered those active ingredients which have a vapor pressure of 0.01 mPa or higher at 25° C.

For example, the vapor pressure of dicamba is 4.5 mPa, the vapor pressure of 2,4-D is about 0.019 mPa. For comparison, the vapor pressure of benazolin is 0.0001 mPa (at 20° C.).

Preferably, a composition according to the present invention contains one or more further herbicides (i.e. different from constituent (a)) as constituent (c), if present preferably in a total amount 1% to 60% by weight, more preferably 5% to 50% by weight, even more preferably 10% to 40% by weight, in each case based on the total weight of the composition.

The compositions according to the present invention preferably comprise as constituent (c) one or more crop protectant ingredients selected from the group consisting of salts of glufosinate, salts of glyphosate, salts of auxin herbicides, in particular salts of benzoic acid herbicides and salts of phenoxyacetic acid herbicides.

If the compositions according to the present invention comprise as constituent (c) one or more salts of glufosinate or salts of glyphosate, said salts are preferably selected from the group consisting of glufosinate-ammonium, glufosinate-sodium, L-glufosinate-ammonium, L-glufosinate-sodium, glyphosate-diammonium, glyphosate-dimethylammonium, glyphosate-isopropylammonium, glyphosate-monoammonium, glyphosate-potassium, glyphosate-dipotassium, glyphosate-sesquisodium (N-(phosphonomethyl)glycine sodium salt (2:3)), glyphosate-trimesium.

Preferred as constituent (c) of the compositions according to the present invention are salts of dicamba and/or 2,4-D, in particular the suitable and preferred salts of dicamba and/or 2,4-D mentioned hereinafter.

If the compositions according to the present invention comprise as constituent (c) one or more benzoic acid herbicides and salts thereof and phenoxyacetic acid herbicides and salts thereof, these are preferably selected from the group consisting of dicamba and salts thereof and 2,4.D and salts thereof.

In particular dicamba [3,6-dichloro-2-methoxybenzoic acid] and salts thereof are suitable as (part of) constituent (c) of compositions of the present invention, more specifically the following salts: dicamba-biproamine, dicamba-diglycolamine, dicamba-dimethylammonium, dicamba-diethylammonium, dicamba-diolamine, dicamba-isopropylammonium, dicamba-olamine, dicamba-potassium, dicamba-sodium, dicamba-trolamine, dicamba-choline and dicamba-BAPMA (N,N-bis-(3-aminopropyl)methylamine salt).

In particular 2,4-D [2,4-dichlorophenoxy)acetic acid] and salts thereof are suitable as (part of) constituent (c) of compositions of the present invention, more specifically the following salts: 2,4-D-ammonium, 2,4-D-diethylammonium, 2,4-D-dimethylammonium, 2,4-D-diolamine, 2,4-D-dodecylammonium, 2,4-D-heptylammonium, 2,4-D-isopropylammonium, 2,4-D-lithium, 2,4-D-sodium, 2,4-D-tetradecylammonium, 2,4-D-triethylammonium, 2,4-D-tris(2-hydroxypropyl)ammonium, 2,4-D-trolamine, 2,4-D-choline and 2,4-D-BAPMA (N,N-bis-(3-aminopropyl)methylamine salt).

Preferred in the context of the present invention as constituent (c) of compositions according to the present invention are the following salts of dicamba and/or of 2,4-D: dicamba-diglycolamine, dicamba-dimethylammonium, dicamba-diethylammonium, dicamba-isopropylammonium, dicamba-potassium, dicamba-sodium, dicamba-choline and dicamba-BAPMA (N,N-bis-(3-aminopropyl)methylamine salt), 2,4-D-diethylammonium, 2,4-D-dimethylammonium, 2,4-D-diolamine, 2,4-D-dodecylammonium, 2,4-D-heptylammonium, 2,4-D-isopropylammonium, 2,4-D-sodium, 2,4-D-tetradecylammonium, 2,4-D-triethylammonium, 2,4-D-tris(2-hydroxypropyl)ammonium, 2,4-D-trolamine, 2,4-D-choline and 2,4-D-BAPMA (N,N-bis-(3-aminopropyl)methylamine salt).

Particularly preferably, constituent (c) of compositions according to the present invention comprises or consists of glufosinate-ammonium, glufosinate-sodium, L-glufosinate-ammonium, L-glufosinate-sodium, glyphosate-potassium, glyphosate-ammonium, glyphosate-dimethylammonium, glyphosate-isopropylammonium, glyphosate-trimesium (sulfosate), dicamba-diglycolamine, dicamba-dimethylammonium, dicamba-diethylammonium, dicamba-isopropylammonium, dicamba-potassium, dicamba-sodium, dicamba-choline and dicamba-BAPMA (N,N-bis-(3-aminopropyl)methylamine salt), 2,4-D-diethylammonium, 2,4-D-dimethylammonium, 2,4-D-diolamine, 2,4-D-dodecylammonium, 2,4-D-heptylammonium, 2,4-D-isopropylammonium, 2,4-D-sodium, 2,4-D-tetradecylammonium, 2,4-D-triethylammonium, 2,4-D-tris(2-hydroxypropyl)ammonium, 2,4-D-trolamine, 2,4-D-choline and 2,4-D-BAPMA (N,N-bis-(3-aminopropyl)methylamine salt).

In own experiments the following constituents (c) in combination with benazolin-choline of the present invention gave particularly improved properties for the compositions according to the present invention. Therefore, preferably, constituent (c) of the compositions according to the present invention comprises or consists of salts of glyphosate and salts of dicamba, preferably the salts mentioned above as preferred salts of glyphosate and salts of dicamba.

In the composition according to the present invention, the total amount of benazolin by weight in constituent (a) to the total amount by weight of constituent (c) advantageously is in the range of from 5:1 to 1:15, preferably in the range of from 3:1 to 1:10, more preferably in the range of from 2:1 to 1:5, the amount of benazolin and of the one or more further herbicides of constituent (c) in each case being expressed and calculated in terms of the respective free acid.

Optionally, a composition according to the present invention contains one or more safeners of constituent (d), if present, in a total amount 0.25% to 15% by weight, preferably 0.5% to 10% by weight, more preferably 1% to 5% by weight, in each case based on the total weight of the composition.

As optional constituent (d), the compositions of the present invention can comprise safeners. Preferred safeners of constituent (d) are cyprosulfamide, isoxadifen-ethyl, mefenpyr-diethyl, benoxacor, furilazole and cloquintocet-mexyl.

The compositions of the present invention may optionally comprise as constituent (e) one or more surface-active agents (surfactants) which are able to contribute to improved stability, further improved plant availability or further improved activity benazolin-choline and the optionally present further herbicidal active crop protectant ingredients of constituent (c) and/or optionally present safeners of constituent (d).

Preferably, a composition according to the present invention contains one or more surface-active agents (surfactants) of constituent (e), preferably in a total amount 0.5% to 25% by weight, more preferably 1% to 20% by weight, even more preferably 2% to 15% by weight, in each case based on the total weight of the composition.

These surface-active agents of optional constituent (e) of compositions according to the present invention can be anionic, cationic or nonionic in character and can be employed as emulsifying agents, wetting agents, suspending agents, or for other purposes. Typical surface-active agents include salts of alkyl sulfates, such as diethanolammonium lauryl sulfate; alkylarylsulfonate salts, such as calcium dodecylbenzene sulfonate; alkylphenol-alkylene oxide addition products, such as nonylphenol-$C_{18}$ ethoxylate; alcohol-alkylene oxide addition products, such as tridecyl alcohol-$C_{16}$ ethoxylate; soaps, such as sodium stearate; alkyl naphthalene sulfonate salts, such as sodium dibutyl naphthalene sulfonate; dialkyl esters of sulfosuccinate salts, such as sodium di(2-ethylhexyl) sulfosuccinate; sorbitol esters, such as sorbitol oleate; quaternary amines, such as lauryl trimethylammonium chloride; polyethylene glycol esters of fatty acids, such as polyethylene glycol stearate; block copolymers of ethylene oxide and propylene oxide; and salts of mono and dialkyl phosphate esters and alkyl polyglycosides.

From the group of a non-ionic surfactants, alkyl polysaccharides (e.g., alkyl polyglycosides (APG)) are important surfactants to be mentioned. Alkyl polysaccharide surfactants generally have a degree of polymerization of from 1 to about 8, preferably from 1 to about 5, more preferably from 1 to about 3. Preferably, the alkyl polysaccharide surfactant is based on glucose, i.e. an alkyl polyglucoside surfactant, wherein the alkyl moiety is a branched or straight chain alkyl group having from 4 to 22 carbon atoms, more preferably from 8 to 18 carbon atoms, even more preferably from 8 to 12 carbon atoms or a mixture of alkyl groups having an average value within the given range; and the degree of polymerization is from 1 to about 5, more preferably from 1 to about 3.

Examples of APG surfactants are known in the art and commercially available, such as Agnique® PG8107-G, Agnique® PG 8107-U, Agnique® PG 9116, Agnique® PG 8105 U, Agnique® PG 8105 G, Agnique PG® 8105 C from BASF.

From the group of ionic polymers, like Sodium naphthalene sulphonate formaldehyde condensates or Kraft-lignosulfonate sodium salt, like Morwet® D245 (Nouryon) or Kraftsperse® 25M (Ingevity), or from the group of non-ionic polymers, like Polyethoxylated polymethacrylates, like Atlox® 4913 (Croda) may also be mentioned.

From the group of ionic surfactants, like Dialkyl naphthalene sulfate sodium, like Oparyl® MT800 (Bozzetto), or non-ionic surfactants, like Tristyryl phenol alkoxylates, like Soprophor® 796/P (Solvay) or block-co-polymers of ethylene/propylene oxides, like Pluronic® PE 6800 (BASF) may also be mentioned.

Depending on the amount and type of further herbicidal active crop protectant ingredients of constituent (c) it may be advantageous that constituent (e) of the compositions according to the present invention comprises or consists of one or more $C_{10}$-$C_{16}$ fatty alcohol diethylene glycol ether sulfate salts and/or $C_8$-$C_{12}$ alkyl polyglucosides with a degree of polymerization of less than 5, and/or $C_{12}$-$C_{16}$ alkyl amine ethoxylates with 2 to 10 ethylene oxide (EO) units, preferably $C_{12}$-$C_{14}$ fatty alcohol diethylene glycol ether sulfate sodium-, potassium-, ammonium-salts (preferably sodium salts) and/or $C_8$-$C_{10}$ alkyl polyglucosides with a degree of polymerization of less than 2, and/or $C_{12}$-$C_{14}$ alkyl amine ethoxylates with 4 to 8 ethylene oxide (EO) units [preferably 3-isotridecyloxypropanamine, ethoxylated (CAS number 68478-96-6; systematic name: Poly(oxy-1,2-ethanediyl),.alpha.,.alpha.'-[[[3-(tridecyloxy)propyl]imino]di-2,1-ethanediyl]bis [omega.-hydroxy-, branched)].

The optionally present organic solvents of constituent (f) of the compositions according to the present invention should only to be used in amounts such that the aqueous phase is stable, preferably in the form of a thermodynamically stable aqueous solution.

Suitable organic solvents of optional constituent (f) of the compositions according to the present invention preferably water-miscible organic solvents, examples being aliphatic alcohols, such as lower alkanols, for example, such as methanol and ethanol or polyhydric alcohols such as ethylene glycol and glycerol, polar ethers such as alkylene glycol monoalkyl and dialkyl ethers, such as propylene glycol, propylene glycol monomethyl ether, propylene glycol monoethyl ether, dipropylene glycol, dipropylene glycol monomethyl ether, ethylene glycol monomethyl ether or monoethyl ether, diethylene glycol, hexylene glycol, diglyme and tetraglyme;

amides such as dimethylformamide, dimethylacetamide, dimethylcaprylamide, dimethylcapramide and N-alkylpyrrolidones such as N-methylpyrrolidone (NMP), N-butypyrrolidone (NBP).

Preference is given here to largely water-miscible organic solvents. Preferably, constituent (f) comprises or consists of NMP, NBP, propylene glycol monomethyl ether, dipropylene glycol and/or propylene glycol, and preferably comprises or consists of 1-methoxy-2-propanol and/or dipropylene glycol.

Optionally, a composition according to the present invention may contain one or more organic solvents as constituent (f), preferably in a total amount 0.25% to 20% by weight, more preferably 0.5% to 15% by weight, even more preferably 1% to 10% by weight, in each case based on the total weight of the composition. The total amount of constituent (f) in a composition according to the present invention however inter alia depends on the herbicidal active crop protectant ingredient(s) present as (part of) constituent (c) and (d).

These other additives or ingredients may be introduced into the compositions of the present invention to provide or improve certain desired properties or characteristics of the formulated product.

As constituent (g), the compositions of the invention can comprise formulation adjuvants different from constituents (e) and (f), i.e. customary formulation adjuvants, examples being inert materials, such as stickers, solubility-enhancing agents, wetters, dispersants, emulsifiers, penetrants, preservatives, anti-microbials, inorganic salts, stabilizers, frost protectants (antifreeze agents), fillers, carriers, colorants (dyes), evaporation inhibitors and pH modifiers (buffers, acids, and bases), viscosity modifiers (e.g., thickeners, thickening agents) foam-moderating agents (e.g. defoamers).

Preferably, a composition according to the present invention optionally contains constituent (g), preferably in a total amount 0.05% to 10% by weight, more preferably 0.1% to 7.5% by weight, even more preferably 0.1% to 5% by weight, in each based on the total weight of the composition.

In case of the presence of constituent (e), it may be advantageous to include a defoamer as (part of) constituent (g) of the present invention. Suitable defoamers include all customary defoamers, preferably silicone-based defoamers, such as silicone oils, for example. The silicone oils can also be used as emulsions.

Defoamers from the group of the linear polydimethylsiloxanes contain as their chemical backbone a compound of the formula HO—[Si(CH$_3$)$_2$—O—]$_n$—H, in which the end groups are modified, by etherification for example, or in general are attached to the groups —Si(CH$_3$)$_3$. Preferred defoamers are those from the group of the linear polydimethylsiloxanes, preferably containing silica, in particular those mentioned in U.S. Pat. No. 8,901,041. Silica embraces forms/modifications such as polysilicic acids, meta-silicic acid, ortho-silicic acid, silica gel, silicic acid gels, kieselguhr, precipitated SiO$_2$, etc.

In case the compositions of the present invention comprise further herbicidal active crop protectant ingredients having a low water solubility as part of constituent (c) of the compositions of the present invention, it is preferred to include one or more stabilizers as part of constituent (g) of the compositions of the present invention.

Such a stabilizer can be from the group of the aluminum silicates and can be a mineral fiber, such as a fiberlike magnesium and aluminum silicate attapulgite, preferably Attagel® 40 (BASF) or Clarsol® ATC (from CECA). Also suitable are Bentone® EW (from Elementis), which likewise comprise hectorites as their base material.

In the compositions according to the present invention, the total molar amount of the choline (N,N,N-trimethylmethanol ammonium) cation to the benazolin anion preferably is equal to or greater than 1:1, more preferably in the range of from 8:1 to 1:1, particularly preferably in the range of from 5:1 to 1:1.

Preferably, a composition according to according to the present invention comprises one or more herbicides selected from the group consisting of auxin herbicides and salts thereof as constituent (c) and wherein said composition has reduced volatility properties regarding said auxin herbicides of constituent (c) compared to the otherwise identical composition without benazolin-choline when both compositions are tested under the same conditions.

In a further aspect, the present invention relates to a process for the preparation of benazolin-choline, comprising the step of (i) reacting benazolin and choline-hydroxide in water and (ii) removing water.

In a further aspect, the present invention relates to a process for preparing a composition according to according to the present invention as defined hereinabove, comprising step (i) reacting benazolin and choline-hydroxide, optionally (ii) removing water, and (iii) mixing with further constituents optionally present in said composition.

Benazolin-choline or the compositions (used) according to the invention as defined herein have herbicidal efficacy against a broad spectrum of dicotyledonous harmful plants, in particular an excellent herbicidal efficacy against a broad spectrum of economically important dicotyledonous harmful plants, particularly of the genera and the species mentioned hereinafter.

Examples of such dicotyledonous harmful plants belong to the following genera: *Abutilon, Alternanthera, Amaranthus, Ambrosia, Anoda, Anthemis, Aphanes, Artemisia, Atriplex, Bellis, Bidens, Capsella, Carduus, Cassia, Centaurea, Chenopodium, Cirsium, Convolvulus, Datura, Desmodium, Emex, Erysimum, Euphorbia, Galeopsis, Galinsoga, Galium, Hibiscus, Kochia, Lamium, Lepidium, Lindernia, Matricaria, Mentha, Mercurialis, Mullugo, Myosotis, Papaver, Pharbitis, Plantago, Polygonum, Portulaca, Ranunculus, Raphanus, Rorippa, Rotala, Rumex, Salsola, Senecio, Sesbania, Sida, Sinapis, Solanum, Sonchus, Sphenoclea, Stellaria, Taraxacum, Thlaspi, Trifolium, Urtica, Veronica, Viola, Xanthium.*

The present invention therefore also relates to a method for controlling unwanted plants, preferably in crops of plants, where benazolin-choline or a composition (used) according to the invention as defined herein is applied to the plants (for example harmful plants such as monocotyledonous or dicotyledonous weeds or undesired crop plants), to the soil in or on which the plants grow (for example the soil of cropland or non-cropland) or to the area on which the plants grow (for example the area under cultivation).

Benazolin-choline or the compositions (used) according to the invention as defined herein were found to be more effective—in comparison to (compositions comprising) other benazolin salts—in the control of dicotyledonous harmful plants, for example dicotyledonous harmful plants belong to the following genera: *Alternanthera, Amaranthus, Chenopodium, Euphorbia* and *Portulaca*, as shown in the biological examples hereinafter for the species *Alternanthera tenella* (ALRTE), *Amaranthus retroflexus* (AMARE), *Chenopodium album* (CHEAL), *Euphorbia heterophylla* (EPHHL), and *Portulaca oleracea* (POROL).

Benazolin-choline or the compositions (used) according to the invention as defined herein are preferably applied post-emergence to the green parts of the plants, then growth stops after the treatment, and the harmful plants remain at the growth stage of the time of application, or die completely after a certain time, such that competition by the weeds, which is harmful to the crop plants, is thus eliminated very early and in a lasting manner.

Although benazolin-choline or the compositions (used) according to the invention as defined herein display an outstanding herbicidal activity against dicotyledonous weeds, dicotyledonous crop plants of economically important crops are damaged only to an insignificant extent, or not at all, for example dicotyledonous crops of the genera *Arachis, Brassica, Helianthus, Glycine, Gossypium, Nicotiana, Phaseolus, Pisum, Solanum* or *Vicia*.

Furthermore, it has been found that benazolin-choline or the compositions (used) according to the invention as defined herein show excellent or very good post-emergence action, and are particularly selective in certain crops, in particular in dicotyledonous crops of the genera *Brassica, Helianthus, Glycine, Gossypium*, in particular oilseed rape, cotton and soybeans, as well as in monocotyledonous crops of the genera *Avena, Hordeum, Oryza, Saccharum, Secale, Sorghum, Triticale, Triticum, Zea*, in particular in *Zea mays* (maize, corn), barley, wheat and rye.

For these reasons, benazolin-choline or the compositions (used) according to the invention as defined herein are very suitable for selective control of unwanted plant growth in plant crops such as agriculturally useful plants or ornamentals.

In a further aspect the present invention therefore relates to a method of controlling unwanted plant growth (in particular of dicotyledonous plants), which comprises applying an herbicidal effective amount of benazolin-choline or of a composition according to the present inventions as defined in the context of the present invention to plants, parts of plants or the cultivation area.

In a further aspect the present invention therefore relates to the use of benazolin-choline or a composition as defined in the context of the present invention for controlling unwanted plant growth (in particular of dicotyledonous plants).

A method of
(i) increasing the herbicidal activity of a composition comprising one or more herbicides selected from the group consisting of glufosinate and salts thereof, glyphosate and salts thereof, and auxin herbicides and salts thereof,
and/or
(ii) reducing the volatility of a composition comprising one or more herbicides selected from the group consisting of auxin herbicides salts,
compared to an otherwise identical composition without benazolin-choline when tested under the same conditions,
wherein the method comprises mixing benazolin-choline or a composition a composition according to the present inventions as defined in the context of the present invention with one or more of the said herbicides wherein benazolin-choline preferably is applied in an amount in the range of 50 g/ha to 700 g/ha, preferably in the range of 100 g/ha to 500 g/ha.

Use of benazolin-choline or of a composition according to the present inventions as defined in the context of the present invention to
(i) increase the herbicidal activity of a composition comprising one or more herbicides selected from the group consisting of glufosinate and salts thereof, glyphosate and salts thereof, and auxin herbicides and salts thereof, and/or
(ii) reduce the volatility of a composition comprising one or more herbicides selected from the group consisting of auxin herbicides salts,
compared to an otherwise identical composition without benazolin-choline when tested under the same conditions, wherein benazolin-choline preferably is applied in an amount in the range of 50 g/ha to 700 g/ha, preferably in the range of 100 g/ha to 500 g/ha.

EXAMPLES

Unless indicated otherwise, all amounts, percentages and ratios indicated in the following are by weight.

Abbreviations and products used (including trade names):
a.e.=acid equivalent (content)
a.i.=(amount of) Active Ingredient
AMS=Ammonium sulfate
Benazolin=IUPAC name: 4-Chloro-2,3-dihydro-2-oxo-1,3-benzothiazol-3-ylacetic acid
Benazolin-BAPMA=benazolin-N,N-Bis-(3-aminopropyl) methylamine (BAPMA) salt
Benazolin-choline=benazolin-choline salt
Benazolin-DEA=benazolin-diethanolamine salt
Benazolin-DGA=benazolin-diglycolamine salt
Benazolin-DMA=benazolin-dimethylamine salt
Benazolin-ethyl=IUPAC name: Ethyl (4-chloro-2-oxo-1,3-benzothiazol-3(2H)-yl)acetate (Chemieliva Pharmaceutical)
Benazolin-K=benazolin-potassium salt
Choline hydroxide=IUPAC name: (2-Hydroxyethyl)trimethylammonium hydroxide (used as 46 wt.-% solution in water, Sigma-Aldrich)
Clarity®=water soluble concentrate SL formulation of dicamba as 2-(2-aminoethoxy)ethanol salt (480 g a.e./L, BASF)
Diglycolamine=2-(2-Aminoethoxy)ethanol, 98% purity (Huntsman)
Roundup Weathermax®=water soluble concentrate SL formulation of glyphosate as potassium salt (540 g a.e./L, Monsanto/Bayer)

Preparation of Salts of Benazolin and their Use Dissolved in Water to Prepare SL Formulations Example P1: Benazolin-Choline Benazolin acid (49.63 g, 203.68 mmol, 1.00 eq) was dissolved in 200 mL of methanol and 50 mL (53.65 g) of an aqueous solution (46 wt.-% in water) of beta-hydroxyethyltrimethylammonium hydroxide (203.68 mmol, 1.00 eq) were added. The resulting dark brown solution was stirred at room temperature for two hours, evaporated to dryness, mixed with 300 mL of heptane and again evaporated to dryness. The resulting gum was treated with 66 mL of 2-propanol for 5 minutes in an ultrasonic bath and left on standing for two days at room temperature. The final slurry was filtered of; the filter cake was washed with a few milliliters of heptane and sucked to dryness to yield a first crop of 38.65 g of benazolin-choline salt (98% purity) as slightly beige solid. The filtrate was evaporated to dryness, the resulting sticky solid again was treated with 30 mL of 2-propanol for 10 minutes in an ultrasonic bath and left on standing for 15 minutes at room temperature. Filtration, careful washing of the filter cake with a few milliliters of heptane and 2-propanol each yielded after drying of the yellow to beige solid at 50° C. under vacuum a second crop of 13.33 g benazolin-choline salt (99% purity). Both crops were combined to yield 51.98 g (73% of theory; 98% purity) of benazolin-choline salt as slightly beige solid. Melting point 153-154° C. $^1$H-NMR (400 MHz, DMSO δ, ppm) 7.59 (dd, 1H), 7.30 (dd, 1H), 7.11 (dt, 1H), 6.02 (br. s, 1H), 4.51 (s, 2H), 3.82 (br. s, 2H), 3.39 (m, 2H), 3.10 (s, 9H).

The benazolin-diethanolamine salt, the benazolin-N,N-Bis-(3-aminopropyl)-methylamine salt and the benazolin-diglycolamine salt were prepared as described in Example P1 for the benazolin-choline salt using 1 molar equivalent of the respective amine accordingly. Melting points in ° C. and $^1$H-NMR data (measured in DMSO or $D_2O$) for these benazolin salts are described in the following table:

| Name | Structure | Melting point in °C | $^1$H-NMR (400 MHz, δ, ppm) in DMSO or $D_2O$ |
|---|---|---|---|
| Benazolin-choline | | 153-154 | (DMSO) 7.59 (dd, 1H), 7.30 (dd, 1H), 7.11 (dt, 1H), 6.02 (br. s, 1H), 4.51 (s, 2H), 3.82 (br. s, 2H), 3.39 (m, 2H), 3.10 (s, 9H). |
| Benazolin-diethanolamine | | 148-151 | (DMSO) 7.62 (dd, 1H), 7.32 (dd, 1H), 7.13 (dt, 1H), 4.64 (s, 2H), 3.53 (t, 2H), 3.49 (t, 2H), 3.44 (t, 2H), 3.38 (br. 4H), 2.91 (t, 2H). |
| Benazolin-N, N-Bis-(3-aminopropyl)-methylamine | | 183-186 | ($D_2O$) 7.55 (dd, 1H), 7.43 (dd, 1H), 7.21 (dt, 1H), 4.93 (br. s, 4H), 2.99 (t, 4H), 2.55 (t, 4H), 2.27 (s, 3H), 1.86 (m, 4H). |
| Benazolin-diglycolamine | | 158.5 | ($D_2O$) 7.55 (dd, 1H), 7.43 (dd, 1H), 7.21 (dt, 1H), 4.91 (br. s, 3H), 3.88 (t, 4H), 3.26 (t, 4H). |

Example P2: Benazolin-Choline SL 14.2

14.52 g of benazolin-choline (98% purity) from Example P1 was dissolved under stirring in 985.47 g of demineralized water. After 2 h stirring at room temperature, no undissolved particles were detected and the formulation resulted in a clear transparent solution.

General Procedure S1—Preparation of SL Formulation of Benazolin Salts:

Various aqueous herbicidal compositions containing a benazolin salt were prepared by adding the desired base to stock benazolin acid solutions. The aqueous herbicidal compositions of the present invention may be prepared by a process that includes benazolin that is neutralized using a molar equivalent or excess of base to fully neutralize the acidic site of benazolin. Salts were prepared comprising benazolin as anion and bases as respective cation. A known quantity of benazolin (free acid) was suspended in water while stirring. The suspension was titrated with the respective base to a pH of 8.0 to 9.5 until all solids were dissolved and the salts formed. Examples P3 to P9 list the details. The benazolin concentration in each of these SL10 formulations expressed as a.e. (acid equivalent, based on the weight of components expressed as the free acid) was 1 wt.-%.

Example P3: Benazolin-Choline SL 10

1.21 g Benazolin (99% purity) was suspended in 117.48 g demineralized water. Slowly, 1.31 g of choline hydroxide solution (46%) was added, until a pH of 8.0-9.5 was reached and the whole quantity of the base was used up. After 1 day stirring at room temperature there was no more acid in suspension and a clear transparent solution was obtained.

Example P4: Benazolin-DGA SL 10 (not According to the Invention)

1.21 g Benazolin (99% purity) was suspended in 118.25 g demineralized water. Slowly, 0.53 g of diglycolamine (98% purity) was added, until a pH of 8.0-9.5 was reached and the whole quantity of the base was consumed. After 1 day stirring at room temperature there was no more acid in suspension and a clear transparent solution was obtained.

Example P5: Benazolin-DEA SL 10 (not According to the Invention)

1.21 g Benazolin (99% purity) was suspended in 118.25 g demineralized water. Slowly, 1 molar equivalent of diethanolamine was added, until a pH of 8.0-9.5 was reached and the whole quantity of the base was consumed. After 1 day stirring at room temperature there was no more acid in suspension and a clear transparent solution was obtained.

Example P6: Benazolin-DGA SL 10 (not According to the Invention)

1.21 g Benazolin (99% purity) was suspended in 118.25 g demineralized water. Slowly, 1 molar equivalent of diglycolamine was added, until a pH of 8.0-9.5 was reached and the whole quantity of the base was consumed. After 1 day stirring at room temperature there was no more acid in suspension and a clear transparent solution was obtained.

Example P7: Benazolin-DMA SL 10 (not According to the Invention)

1.21 g Benazolin (99% purity) was suspended in 118.25 g demineralized water. Slowly, 1 molar equivalent of dimethylamine (used as 40 wt.-% aqueous solution) was added, until a pH of 8.0-9.5 was reached and the whole quantity of the base was consumed. After 1 day stirring at room temperature there was no more acid in suspension and a clear transparent solution was obtained.

Example P8: Benazolin-BAPMA SL 10 (not According to the Invention)

1.21 g Benazolin (99% purity) was suspended in 118.25 g demineralized water. Slowly, 1 molar equivalent of N,N-Bis-(3-aminopropyl) methylamine was added, until a pH of 8.0-9.5 was reached and the whole quantity of the base was consumed. After 1 day stirring at room temperature there was no more acid in suspension and a clear transparent solution was obtained.

Example P9: Benazolin-K SL 10 (not According to the Invention)

1.21 g Benazolin (99% purity) was suspended in 118.25 g demineralized water. Slowly, 1 molar equivalent of potassium hydroxide (used as 45 wt.-% aqueous solution) was added, until a pH of 8.0-9.5 was reached and the whole quantity of the base was consumed. After 1 day stirring at room temperature there was no more acid in suspension and a clear transparent solution was obtained.

Examples Concerning Weed Control Efficacy, Volatility and Formulation Compatibility When evaluating different benazolin forms for regarding technical aspects and effects, inter alia the following were found:
B1 Benazolin-choline showed the highest weed control activity of the benazolin forms (benazolin, benazolin-ethyl and different benazolin salts) tested.
B2 Benazolin-choline showed the highest weed control efficacy when combined with dicamba in a tank mix compared to other benazolin salts.
B3 Comparison of the different benazolin salts showed that the volatility of benazolin-choline was the lowest.
B4 When benazolin salts are combined with dicamba (salts), the volatility of dicamba is reduced. Benazolin-choline showed surprisingly the best effect of the tested benazolin salts.
B5 Benazolin-choline revealed superior formulation compatibility with other herbicides, such as dicamba and glyphosate, compared to other benazolin salts.

Biological Examples B1 and B2

The different forms of benazolin were applied to weed plants in the greenhouse or in the field at the growth stage indicated for the different weed species hereinafter.

The trials in the greenhouse were sprayed with an application volume of 300 L/ha with an automated track sprayer. The plots in the field were sprayed with an application volume of 140 L/ha with a hand held spray boom.

Twenty-one days after application (21 DAA) or twenty-eight days after application (28 DAA) the different weed species were visually rated on a percentage scale in relation to the untreated control (100%=all plants dead; 50%=green plant biomass reduced by 50%, and 0%=no discernible difference=like control plot).

The herbicidal efficacy regarding the following weed species were investigated:

*Alternanthera tenella* (ALRTE), *Amaranthus retroflexus* (AMARE), *Chenopodium album* (CHEAL), *Euphorbia heterophylla* (EPHHL), and *Portulaca oleracea* (POROL).

The growth stages of the different weed species are indicated according to the BBCH monograph "Growth stages of mono- and dicotyledonous plants", 2nd edition, 2001, ed. Uwe Meier, Federal Biological Research Centre for Agriculture and Forestry (Biologische Bundesanstalt für Land and Forstwirtschaft).

Table B1a shows the data observed for the weed control efficacy data of benazolin, benazolin-ethyl and different benazolin salts on AMARE plants 21 days after application.

TABLE B1a

Greenhouse weed control efficacy data of different benazolin forms on AMARE at BBCH 16-19 at time of application, evaluation 21 DAA

| Benazolin form | Amount [in a.e. g/ha] | % Control compared to untreated AMARE plants 21 DAA |
| --- | --- | --- |
| Benazolin-choline | 100 g/ha | 70 |
| Benazolin-BAPMA | 100 g/ha | 65 |
| Benazolin-DGA | 100 g/ha | 40 |
| Benazolin-ethyl | 100 g/ha | 35 |
| Benazolin | 100 g/ha | 25 |

Table B1b shows the data observed for the weed control efficacy data of benazolin, benazolin-ethyl, benazolin-DGA in comparison to benazolin-choline on ALRTE, EPHHL and POROL plants 21 and 28 days after application, respectively.

TABLE B1b

Field weed control efficacy data of different benazolin forms on ALRTE at BBCH 14-16, EPHHL at BBCH 16-17 and POROL at BBCH 21-22 at time of application, evaluation 21 or 28 DAA

| Benazolin form | Amount [in a.e. g/ha] | % Control compared to untreated ALRTE plants 21 DAA | % Control compared to untreated EPHHL plants 28 DAA | % Control compared to untreated POROL plants 28 DAA |
| --- | --- | --- | --- | --- |
| Benazolin-choline | 200 g/ha | 48 | 13 | 100 |
| Benazolin-DGA | 200 g/ha | 44 | 8 | 50 |
| Benazolin-ethyl | 200 g/ha | 40 | 8 | 88 |
| Benazolin | 200 g/ha | 40 | 5 | 88 |

Tables B2a, B2b and B2c show the respective data observed for the weed control efficacy data of different benazolin salts in combination with different amounts (g a.e./ha) of dicamba (used as Clarity®) on AMARE and CHEAL plants, each 21 days after application.

TABLE B2a

Greenhouse weed control efficacy data of b different benazolin salts in combination with 100 g a.e./ha dicamba (used as Clarity ®) on AMARE at BBCH 16-19 and CHEAL at BBCH 15-24 at time of application, evaluation 21 DAA

| Active ingredients | Amount [in a.e. g/ha] | % Control compared to untreated plants 21 DAA | |
|---|---|---|---|
| | | AMARE | CHEAL |
| Benazolin-choline | 100 g/ha | 50 | 70 |
| Dicamba (Clarity ®) | 100 g/ha | | |
| Benazolin-BAPMA | 100 g/ha | 35 | 50 |
| Dicamba (Clarity ®) | 100 g/ha | | |
| Benazolin-DGA | 100 g/ha | 35 | 25 |
| Dicamba (Clarity ®) | 100 g/ha | | |

TABLE B2b

Greenhouse weed control efficacy data of different benazolin salts in combination with 200 g a.e./ha dicamba (used as Clarity ®) on AMARE at AMARE at BBCH 16-19 and CHEAL at BBCH 15-24 at time of application, evaluation 21 DAA

| Active ingredients | Amount [in a.e. g/ha] | % Control compared to untreated plants 21 DAA | |
|---|---|---|---|
| | | AMARE | CHEAL |
| Benazolin-choline | 100 g/ha | 80 | 80 |
| Dicamba (Clarity ®) | 200 g/ha | | |
| Benazolin-BAPMA | 100 g/ha | 50 | 65 |
| Dicamba (Clarity ®) | 200 g/ha | | |
| Benazolin-DGA | 100 g/ha | 40 | 65 |
| Dicamba (Clarity ®) | 200 g/ha | | |

TABLE B2c

Greenhouse weed control efficacy data of different benazolin salts in combination with 300 g a.e./ha dicamba (used as Clarity ®) on AMARE at AMARE at BBCH 16-19 and CHEAL at BBCH 15-24 at time of application, evaluation 21 DAA

| Active ingredients | Amount [in a.e. g/ha] | % Control compared to untreated plants 21 DAA | |
|---|---|---|---|
| | | AMARE | CHEAL |
| Benazolin-choline | 100 g/ha | 75 | 85 |
| Dicamba (Clarity ®) | 300 g/ha | | |
| Benazolin-BAPMA | 100 g/ha | 65 | 67 |
| Dicamba (Clarity ®) | 300 g/ha | | |
| Benazolin-DGA | 100 g/ha | 55 | 50 |
| Dicamba (Clarity ®) | 300 g/ha | | |

Volatility Examples B3 and B4

In example B3 the volatility of different benazolin salts was determined and in example B4 the volatility of dicamba in the presence of different benazolin salts.

Determination of the Volatility in Example B3

A spray solution (0.5 g benazolin calculated as acid equivalent benazolin/L in tap water) was prepared and sprayed with a track sprayer or applied as a 5 µl drop on a teflon disk or membrane, with 5 replicates each. These were placed under an exhaust hood open on top and an air inlet on bottom with an air stream of 1.6 m/s at 22° C., 1013 mbar and 60% relative humidity. After 72 hours the Teflon disks were extracted and the remaining quantity of benazolin determined by HPLC. The results of the respective volatility trials were then averaged and put in relation to the initial amount. Thus, based on the measured recovery of the benazolin, the volatility was calculated accordingly.

TABLE B3

Volatility test results

| Benazolin salt | Relative benazolin volatility after 72 h |
|---|---|
| Benazolin-choline SL 10 (Example P3) | 1.1 wt.-% |
| Benazolin-DEA SL 10 (Example P5) | 2.9 wt.-% |
| Benazolin-BAPMA SL 10 (Example P8) | 6.4 wt.-% |

The data show that after 72 hours (3 days) the benazolin loss due to volatility is the lowest when choline was used as cation for benazolin.

Volatility Studies in Example B4

A spray solution (0.5 g dicamba calculated as acid equivalent dicamba/L used as commercial formulation Clarity® and 1.0 g benazolin calculated as acid equivalent benazolin/L in tap water) was prepared and sprayed with a track sprayer or applied as a 5 µl drop on a teflon disk or membrane, with 5 replicates each. These were placed under an exhaust hood open on top and an air inlet on bottom with an air stream of 1.6 m/s at 22° C., 1013 mbar and 60% relative humidity. After 72 hours the Teflon disks were extracted and the remaining quantity of dicamba determined by HPLC. The results of the respective volatility trials were then averaged and put in relation to the initial amount. Thus, based on the measured recovery of the dicamba, the volatility was calculated accordingly.

In Example B4 the commercial formulation of dicamba Clarity® was mixed with AMS (1 g/L) and with the respective benazolin salt SL 10 formulation in a 1:2 ratio by weight (w/w), said ratio referring to the respective a.e. content of dicamba and benazolin.

AMS is often used in dicamba spray solutions to increase the herbicidal efficacy of dicamba or glyphosate. One effect of the addition of AMS is that the volatility of dicamba in dicamba spray solutions is increased. Different benazolin salts (used in the form of their respective SL10 solutions) were added thereto to determine the influence of the respective benazolin salt on the volatility of dicamba. Adding certain benazolin salts lead to a reduction of the volatility of dicamba even in the presence of AMS (that usually is the cause of the high volatility of dicamba spray solutions). In Example B4 AMS was also used to obtain more pronounced differences in absolute values for the recovery percentages such that the recovery values were more reliable and showed less statistical variance.

TABLE B4

Results from volatility studies by addition of different benazolin salts to a commercial dicamba formulation (Clarity ®), spray application, ratio (a.e.) of benazolin:dicamba 2:1 (w/w)

| Clarity ®* | Benazolin salt | Relative dicamba recovery after 72 h |
|---|---|---|
| Dicamba | — | 39 wt.-% |
| Dicamba | Benazolin-BAPMA SL 10 (Example P8) | 37 wt.-% |
| Dicamba | Benazolin-K SL 10 (Example P9) | 42 wt.-% |
| Dicamba | Benazolin-DEA SL 10 (Example P5) | 42 wt.-% |
| Dicamba | Benazolin-DGA SL 10 (Example P4) | 55 wt.-% |
| Dicamba | Benazolin-DMA SL 10 (Example P7) | 56 wt.-% |
| Dicamba | Benazolin-choline SL 10 (Example P3) | 64 wt.-% |

*Dicamba was used as commercial formulation Clarity ® and 1 g/L AMS was added thereto to increase the volatility of dicamba The influence on the reduction of the volatility of dicamba (used as commercial formulation Clarity®) was investigated for different benazolin salts. The data in Table B4 show that benazolin-choline is superior to other choline salts in respect to reducing volatility of dicamba (when mixed with AMS).

Formulation Compatibility Example B5

It is known that mixing up salts of different counter ions might lead to solubility problems and eventually to crystal formation, especially at low temperatures. Such crystal formation is a hint on instability of soluble liquid formulations. Here simple mixing experiments were performed with soluble liquid SL 10 formulations of benazolin salts containing 1 wt.-% a.e. of benazolin (see General procedure 51 above) containing no surfactant and commercially available dicamba and glyphosate formulations.

Formulation compatibility (solubility, miscibility and storability) tests of different benazolin salt SL 10 formulations in mixture with commercial formulations of herbicides such as dicamba or glyphosate were performed. In these tests, benazolin-choline showed the best miscibility with dicamba and glyphosate in composition trials compared to the other tested salts of benazolin.

In all cases, no crystals were seen with the bare eye at bottom of flask. Microscopic evaluation however revealed differences regarding crystal formation.

In a first experiment, Clarity® (a commercial formulation of dicamba) was tank mixed with the respective benazolin salt SL 10 formulation in a 2:1 ratio by weight (w/w) based on the respective a.e. contents (in Table B5a referred to as "Ratio") and the vial placed at 5° C. for 2 days. Afterwards, microscopic inspection of the shaken mixture was done and crystal formation was noted (results are shown in Table B5a).

TABLE B5a

Crystal formation evaluation after low temperature storage: mixing with dicamba (Clarity ®):

| Commercial formulation of dicamba | Benazolin salt used as SL10 | Ratio | Microscopic evaluation (size of crystals in μm) |
|---|---|---|---|
| Clarity ® | Benazolin-choline | 2:1 | No crystals |
| Clarity ® | Benazolin-DEA | 2:1 | Crystal formation (20-40 μm), platelets + needles |

Benazolin-choline showed an advantage compared to benazolin-DEA when mixed with a standard commercial formulation of dicamba (Clarity®) since no crystal formation was observed when stored at low temperatures.

In a second experiment, Roundup® Weathermax was tank mixed with the respective benazolin salt SL 10 formulation in a 4:1 ratio by weight (w/w) based on the respective a.e. contents (in Table B5b referred to as "Ratio") and the vial placed at 5° C. for 2 days. Afterwards, microscopic inspection of the shaken mixture was done and crystal formation was noted (results are shown in Table B5b).

TABLE B5b

Crystal formation evaluation after low temperature storage: mixing with glyphosate (Roundup ® Weathermax):

| Commercial formulation of glyphosate | Benazolin salt used as SL10 | Ratio | Microscopic evaluation (size of crystals in μm) |
|---|---|---|---|
| Roundup ® Weathermax | Benazolin-choline | 4:1 | No crystals |
| Roundup ® Weathermax | Benazolin-DGA | 4:1 | Crystal formation (60-100 μm), needles |
| Roundup ® Weathermax | Benazolin-K | 4:1 | Crystal formation (20-50 μm), platelets + needles |

Benazolin-choline showed an advantage compared to benazolin-DGA and benazolin-K when mixed with a standard commercial formulation of glyphosate (Roundup® Weathermax) since no crystal formation was observed when stored at low temperatures.

Embodiments 1 to 31 of the Present Invention

Embodiment 1. Benazolin-choline having the following structure

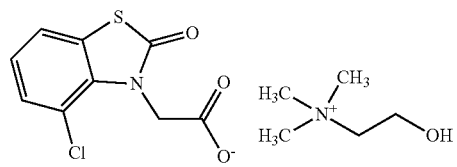

Embodiment 2. Composition, preferably liquid composition, suitable for use in the agrochemical field comprising or consisting of (i) (an effective amount of) benazolin-choline, preferably in a total amount of from 0.25% to 80% by weight based on the total weight of the composition, and (ii) one or more constituents which are not herbicidal active crop protectant ingredient(s).

Embodiment 3. Composition, preferably liquid composition, comprising or consisting of
- (a) benazolin-choline, preferably in a total amount of from 0.25% to 60% by weight, more preferably in a total amount of from 0.5% to 40% by weight, and
- (b) water, preferably in a total amount of up to 99.75% by weight, more preferably of up to 99.5% by weight, in each case based on the total weight of the composition.

Embodiment 4. The (preferably liquid) composition according to Embodiment 2 or 3, comprising one or more further constituents selected from the group consisting of constituents (c) to (g):
- (c) one or more further herbicides (i.e. different from constituent (a)),
- (d) one or more safeners,
- (e) one or more surface-active agents,
- (f) one or more organic solvents,
- (g) one or more other formulation adjuvants (i.e. different from constituents (b), (e) and (f)).

Embodiment 5. The (preferably liquid) composition according to Embodiment 3 or 4, wherein the total amount by weight of constituent (a) to the total amount of constituent (b) is in the range of from 10:1 to 1:300, preferably in the range of from 2:1 to 1:200, more preferably in the range of from 1:1 to 1:100, even more preferably in the range of from 1:2 to 1:50.

Embodiment 6. The (preferably liquid) composition according to any one of Embodiments 3 to 5, comprising one or more further herbicides (i.e. different from constituent (a)) as constituent (c) selected from the group consisting of glufosinate and salts thereof, glyphosate and salts thereof, and auxin herbicides and salts thereof.

Embodiment 7. The (preferably liquid) composition according to any one of Embodiments 6, wherein the auxin herbicides and salts thereof preferably being selected from the group consisting of benzoic acid herbicides, picolinic acid herbicides, pyridinyloxyacetic acid herbicides, quinolinecarboxylic acid herbicides, phenoxyacetic acid herbicides, phenoxybutyric herbicides, phenoxypropionic herbicides and salts of these auxin herbicides.

Embodiment 8. The (preferably liquid) composition according to Embodiment 6, wherein constituent (c) comprises or consists of one or more active ingredients selected from the group consisting of salts of glufosinate, salts of glyphosate, salts of benzoic acid herbicides and salts of phenoxyacetic acid herbicides.

Embodiment 9. The (preferably liquid) composition according to any one of Embodiments 3 to 8, wherein the total amount by weight of benazolin in constituent (a) to the total amount by weight of constituent (c) is in the range of from 5:1 to 1:15, preferably in the range of from 3:1 to 1:10, more preferably in the range of from 2:1 to 1:5, the amount of benazolin and of the one or more further herbicides of constituent (c) in each case being expressed and calculated in terms of the respective free acid.

Embodiment 10. The (preferably liquid) composition according to any one of Embodiments 2 to 9, wherein the total amount of constituent (a) is in the range of from 0.25% to 60% by weight, preferably in the range of from 0.5% to 40% by weight, more preferably in the range of from 1% to 25% by weight, even more preferably in the range of from 5% to 20% by weight, in each case based on the total weight of the composition.

Embodiment 11. The (preferably liquid) composition according to any one of Embodiments 2 to 9, wherein the composition comprises or consists of
constituent (a) in a total amount of from 0.5% to 30% by weight,
constituent (b) in a total amount of from 1% to 80% by weight,
and optionally one or more further constituents selected from the group consisting of constituents (c) to (g)
constituent (c) in a total amount of from 0% to 60% by weight,
constituent (d) in a total amount of from 0% to 15% by weight,
constituent (e) in a total amount of from 0% to 25% by weight,
constituent (f) in a total amount of from 0% to 20% by weight,
constituent (g) in a total amount of from 0% to 10% by weight,
in each case based on the total weight of the composition.

Embodiment 12. The (preferably liquid) composition according to any one of Embodiments 2 to 9, wherein the composition comprises or consists of
constituent (a) in a total amount of from 0.5% to 30% by weight,
constituent (b) in a total amount of from 1% to 80% by weight,
and optionally one or more further constituents selected from the group consisting of constituents (c) to (g)
constituent (c) in a total amount of from 1% to 60% by weight,
constituent (d) in a total amount of from 0.25% to 15% by weight,
constituent (e) in a total amount of from 0.5% to 25% by weight,
constituent (f) in a total amount of from 0.25% to 20% by weight,
constituent (g) in a total amount of from 0.05% to 10% by weight,
in each case based on the total weight of the composition.

Embodiment 13. The (preferably liquid) composition according to any one of Embodiments 2 to 9, wherein the composition comprises or consists of
constituent (a) in a total amount of from 1% to 25% by weight,
constituent (b) in a total amount of from 2% to 60% by weight,
and optionally one or more further constituents selected from the group consisting of constituents (c) to (g)
constituent (c) in a total amount of from 5% to 50% by weight,
constituent (d) in a total amount of from 0.5% to 10% by weight,
constituent (e) in a total amount of from 1% to 20% by weight,
constituent (f) in a total amount of from 0.5% to 15% by weight,
constituent (g) in a total amount of from 0.1% to 7.5% by weight,
in each case based on the total weight of the composition.

Embodiment 14. The (preferably liquid) composition according to any one of Embodiments 2 to 9, wherein the composition comprises or consists of
constituent (a) in a total amount of from 5% to 20% by weight,
constituent (b) in a total amount of from 5% to 50% by weight, and optionally one or more further constituents selected from the group consisting of constituents (c) to (g)

constituent (c) in a total amount of from 10% to 40% by weight, constituent (d) in a total amount of from 1% to 5% by weight, constituent (e) in a total amount of from 2% to 15% by weight, constituent (f) in a total amount of from 1% to 10% by weight, constituent (g) in a total amount of from 0.1% to 5% by weight, in each case based on the total weight of the composition.

Embodiment 15. The (preferably liquid) composition according to any one of Embodiments 2 to 9, wherein the composition comprises or consists of (a) benazolin-choline, (b) water, (c) one or more further herbicides (i.e. different from constituent (a)), and optionally one or more further constituents selected from the group consisting of constituents (d) to (g):

(d) one or more safeners, (e) one or more surface-active agents, (f) one or more organic solvents, (g) one or more other formulation adjuvants (i.e. different from constituents (b), (e) and (f)).

Embodiment 16. The (preferably liquid) composition according to any one of Embodiments 2 to 9, wherein the composition comprises or consists of constituent (a) in a total amount of from 0.5% to 30% by weight, constituent (b) in a total amount of from 1% to 80% by weight, constituent (c) in a total amount of from 1% to 60% by weight, and optionally one or more further constituents selected from the group consisting of constituents (d) to (g)

constituent (d) in a total amount of from 0.25% to 15% by weight, constituent (e) in a total amount of from 0.5% to 25% by weight, constituent (f) in a total amount of from 0.25% to 20% by weight, constituent (g) in a total amount of from 0.05% to 10% by weight, in each case based on the total weight of the composition.

Embodiment 17. The (preferably liquid) composition according to any one of Embodiments 2 to 9, wherein the composition comprises or consists of constituent (a) in a total amount of from 0.5% to 30% by weight, constituent (b) in a total amount of from 1% to 80% by weight, constituent (c) in a total amount of from 1% to 60% by weight, and optionally one or more further constituents selected from the group consisting of constituents (d) to (g)

constituent (d) in a total amount of from 0.25% to 15% by weight, constituent (e) in a total amount of from 0.5% to 25% by weight, constituent (f) in a total amount of from 0.25% to 20% by weight, constituent (g) in a total amount of from 0.05% to 10% by weight, in each case based on the total weight of the composition.

Embodiment 18. The (preferably liquid) composition according to any one of Embodiments 2 to 9, wherein the composition comprises or consists of constituent (a) in a total amount of from 1% to 25% by weight, constituent (b) in a total amount of from 2% to 60% by weight, constituent (c) in a total amount of from 5% to 50% by weight, and optionally one or more further constituents selected from the group consisting of constituents (d) to (g)

constituent (d) in a total amount of from 0.5% to 10% by weight, constituent (e) in a total amount of from 1% to 20% by weight, constituent (f) in a total amount of from 0.5% to 15% by weight, constituent (g) in a total amount of from 0.1% to 7.5% by weight, in each case based on the total weight of the composition.

Embodiment 19. The (preferably liquid) composition according to any one of Embodiments 2 to 9, wherein the composition comprises or consists of constituent (a) in a total amount of from 5% to 20% by weight, constituent (b) in a total amount of from 5% to 50% by weight, constituent (c) in a total amount of from 10% to 40% by weight, and optionally one or more further constituents selected from the group consisting of constituents (d) to (g)

constituent (d) in a total amount of from 1% to 5% by weight, constituent (e) in a total amount of from 2% to 15% by weight, constituent (f) in a total amount of from 1% to 10% by weight, constituent (g) in a total amount of from 0.1% to 5% by weight, in each case based on the total weight of the composition.

Embodiment 20. The (preferably liquid) composition according to any one of Embodiments 2 to 19, wherein the total molar amount of the choline (N,N,N-trimethylethanol ammonium) cation to the benazolin anion is equal to or greater than 1:1, preferably in the range of from 8:1 to 1:1, more preferably in the range of from 5:1 to 1:1.

Embodiment 21. The composition according to any one of Embodiments 2 to 20, wherein the composition is liquid at 25° C. and 1013 mbar, and preferably in the form of a soluble concentrate (soluble liquid concentrate, SL formulation).

Embodiment 22. The (preferably liquid) composition according to any one of Embodiments 3 to 21, wherein the composition comprises one or more herbicides selected from the group consisting of auxin herbicides and salts thereof as constituent (c) and wherein said composition has reduced volatility properties regarding said auxin herbicides of constituent (c) compared to the otherwise identical composition without benazolin-choline when both compositions are tested under the same conditions.

Embodiment 23. A process for the preparation of benazolin-choline according to Embodiment 1, comprising the step of (i) reacting benazolin and choline-hydroxide in water and (ii) removing water.

Embodiment 24. A process for preparing a (preferably liquid) composition as defined in any one of Embodiments 2 to 22, comprising step (i) reacting benazolin and choline-hydroxide, optionally (ii) removing water, and (iii) mixing with further constituents optionally present in said composition.

Embodiment 25. A method of controlling unwanted plant growth (in particular of dicotyledonous plants), which comprises application of an herbicidal effective amount of benazolin-choline according to Embodiment 1 or of a (preferably liquid) composition as defined in any one of Embodiments 2 to 22 to plants, parts of plants or the cultivation area, preferably to plants, parts of plants or the cultivation area of the genera *Brassica, Helianthus, Glycine, Gossypium, Avena, Hordeum, Oryza, Saccharum, Secale, Sorghum, Triticale, Triticum* or *Zea*, in particular oilseed rape, cotton, soybeans, maize (corn), barley, wheat or rye.

Embodiment 26. Use of benazolin-choline according to Embodiment 1 or a (preferably liquid) composition as defined in any one of Embodiments 2 to 22 for controlling unwanted plant growth (in particular of dicotyledonous plants), in particular for controlling unwanted plant growth in a field where plants of the genera *Brassica, Helianthus, Glycine, Gossypium, Avena, Hordeum, Oryza, Saccharum, Secale, Sorghum, Triticale, Triticum* or *Zea*, in particular oilseed rape, cotton, soybeans, maize (corn), barley, wheat or rye, grow or are intended to grow.

Embodiment 27. A method of
(i) increasing the herbicidal activity of a (preferably liquid) composition comprising one or more herbicides selected from the group consisting of glufosinate and salts thereof, glyphosate and salts thereof, and auxin herbicides and salts thereof, and/or
(ii) reducing the volatility of a composition comprising one or more herbicides selected from the group consisting of auxin herbicides and salts thereof, compared to an otherwise identical composition without benazolin-choline when tested under the same conditions,
wherein the method comprises mixing benazolin-choline according to Embodiment 1 or a (preferably liquid) composition according to Embodiment 2 or 3 with one or more of the said herbicides.

Embodiment 28. Use of benazolin-choline according to Embodiment 1 or of a composition according to Embodiment 2 or 3 to
(i) increase the herbicidal activity of a (preferably liquid) composition comprising one or more herbicides selected from the group consisting of glufosinate and salts thereof, glyphosate and salts thereof, and auxin herbicides and salts thereof, and/or
(ii) reduce the volatility of a (preferably liquid) composition comprising one or more herbicides selected from the group consisting of auxin herbicides and salts thereof, compared to an otherwise identical composition without benazolin-choline when tested under the same conditions.

Embodiment 29. The method according to Embodiment 25 or 27, wherein benazolin-choline is applied in an amount in the range of 50 g/ha to 700 g/ha, preferably in the range of 100 g/ha to 500 g/ha.

Embodiment 30. The use according to Embodiment 26 or 28, wherein benazolin-choline is applied in an amount in the range of 50 g/ha to 700 g/ha, preferably in the range of 100 g/ha to 500 g/ha.

Embodiment 31. The composition, method or use according to Embodiments 22, 27 or 28, wherein the volatility is determined by the method described in example B4.

What is claimed is:

1. A benazolin salt, the benazolin salt in the form of benazolin-choline having the following structure:

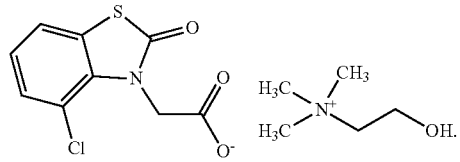

2. A composition suitable for use in the agrochemical field comprising (i) a benazolin-choline constituent and (ii) one or more further constituents.

3. A composition comprising:
(a) benazolin-choline; and
(b) water.

4. The composition according to claim 3, comprising one or more further constituents selected from the group consisting of constituents (c) to (g):
(c) one or more further herbicides;
(d) one or more safeners;
(e) one or more surface-active agents;
(f) one or more organic solvents; and
(g) one or more formulation adjuvants.

5. The composition according to claim 3, wherein a total amount by weight of constituent (a) to a total amount of constituent (b) is in a range of from 10:1 to 1:300.

6. The composition according to claim 3, comprising one or more further herbicides, different from constituent (a), as constituent (c).

7. The composition according to claim 6, wherein constituent (c) comprises one or more active ingredients selected from the group consisting of salts of glufosinate, salts of glyphosate, salts of benzoic acid herbicides and salts of phenoxyacetic acid herbicides.

8. The composition according to claim 6, wherein a total amount by weight of benazolin in constituent (a) to a total amount by weight of constituent (c) is in a range of from 5:1 to 1:15, the amount of benazolin and of the one or more further herbicides of constituent (c) being expressed and calculated in terms of the respective free acid.

9. The composition according to claim 3, wherein a total amount of constituent (a) is in a range of from 0.25% to 60% by weight, based on a total weight of the composition.

10. The composition according to claim 3, wherein the benazolin-choline constituent comprises a choline cation N,N,N-trimethylethanol ammonium and a benazolin anion and a total molar amount of the choline cation to the benazolin anion is equal to or greater than 1:1.

11. The composition according to claim 3, wherein the composition comprises one or more herbicides selected from the group consisting of auxin herbicides and salts thereof as constituent (c) and wherein said composition has reduced volatility regarding said auxin herbicides of constituent (c) compared to the otherwise identical composition without benazolin-choline when both compositions are tested under the same conditions.

12. A process for the preparation of the composition as defined in claim 3, comprising the step of (i) reacting benazolin and choline-hydroxide in water.

13. A method of controlling unwanted plant growth, which comprises applying an herbicidal effective amount of the composition as defined in claim 3 to plants, parts of plants or a cultivation area.

14. A method of (i) increasing the herbicidal activity of a composition comprising one or more herbicides selected from the group consisting of glufosinate and salts thereof, glyphosate and salts thereof, and auxin herbicides and salts thereof, and/or (ii) reducing the volatility of a composition comprising one or more herbicides selected from the group consisting of auxin herbicides salts, compared to an otherwise identical composition without benazolin-choline when tested under the same conditions, wherein the method comprises mixing the composition according to claim 3 with one or more of the herbicides selected from the group consisting of glufosinate and salts thereof, glyphosate and salts thereof, and auxin herbicides and salts thereof.

15. The composition according to claim 6, wherein constituent (c), is selected from the group consisting of glufosinate and salts thereof, glyphosate and salts thereof, and auxin herbicides and salts thereof.

16. A process according to claim 12, further comprising (ii) removing water, and (iii) mixing the benazolin-choline with one or more further constituents present in said composition, the one or more further constituents selected from the group consisting of constituents (c) to (g):
   (c) one or more further herbicides;
   (d) one or more safeners;
   (e) one or more surface-active agents;
   (f) one or more organic solvents; and
   (g) one or more formulation adjuvants.

17. A process for the preparation of benazolin-choline according to claim 1, comprising the step of (i) reacting benazolin and choline-hydroxide in water to produce a composition comprising benazolin-choline.

18. The process according to claim 17, further comprising (ii) removing water, and (iii) mixing the benazolin-choline with one or more further constituents optionally present in said composition, the one or more further constituents selected from the group consisting of constituents (c) to (g):
   (c) one or more further herbicides;
   (d) one or more safeners;
   (e) one or more surface-active agents;
   (f) one or more organic solvents; and
   (g) one or more formulation adjuvants.

19. A method of controlling unwanted plant growth, which comprises applying an herbicidal effective amount of the benazolin-choline according to claim 1 to plants, parts of plants or a cultivation area.

20. A method of (i) increasing the herbicidal activity of a composition comprising one or more herbicides selected from the group consisting of glufosinate and salts thereof, glyphosate and salts thereof, and auxin herbicides and salts thereof, and/or (ii) reducing the volatility of a composition comprising one or more herbicides selected from the group consisting of auxin herbicides salts, compared to an otherwise identical composition without benazolin-choline when tested under the same conditions, wherein the method comprises mixing the benazolin-choline according to claim 1 with one or more of the said herbicides selected from the group consisting of glufosinate and salts thereof, glyphosate and salts thereof, and auxin herbicides and salts thereof.

21. The composition according to claim 2, comprising one or more further constituents selected from the group consisting of constituents (iii) to (vii):
   (iii) one or more further herbicides different from constituent (i);
   (iv) one or more safeners;
   (v) one or more surface-active agents;
   (vi) one or more organic solvents; and
   (vii) one or more formulation adjuvants.

22. The composition according to claim 2, wherein a total amount by weight of constituent (i) to a total amount of one or more further constituents (ii) is in a range of from 10:1 to 1:300.

23. The composition according to claim 21, comprising constituent (iii).

24. The composition according to claim 23, wherein constituent (iii) is selected from the group consisting of glufosinate and salts thereof, glyphosate and salts thereof, and auxin herbicides and salts thereof.

25. The composition according to claim 23, wherein constituent (iii) comprises one or more active ingredients selected from the group consisting of salts of glufosinate, salts of glyphosate, salts of benzoic acid herbicides and salts of phenoxyacetic acid herbicides.

26. The composition according to claim 23, wherein a total amount by weight of benazolin in constituent (i) to a total amount by weight of constituent (iii) is in a range of from 5:1 to 1:15.

27. The composition according to claim 2, wherein a total amount of constituent (i) is in a range of from 0.25% to 60% by weight, based on a total weight of the composition.

28. The composition according to claim 2, wherein the benazolin-choline constituent comprises a choline cation N,N,N-trimethylethanol ammonium and a benazolin anion and a total molar amount of the choline cation to the benazolin anion is equal to or greater than 1:1.

29. The composition according to claim 2, wherein the composition comprises one or more herbicides selected from the group consisting of auxin herbicides and salts thereof as constituent (iii) and wherein said composition has reduced volatility regarding said auxin herbicides of constituent (iii) compared to the otherwise identical composition without benazolin-choline when both compositions are tested under the same conditions.

30. A process for the preparation of the composition as defined in claim 2, the process comprising the step of reacting benazolin and choline-hydroxide in water.

31. The process of claim 30, further comprising removing water, and mixing with one or more further constituents optionally present in said composition, the one or more further constituents selected from the group consisting of constituents (c) to (g):
   (c) one or more further herbicides;
   (d) one or more safeners;
   (e) one or more surface-active agents;
   (f) one or more organic solvents; and
   (g) one or more formulation adjuvants.

32. A method of controlling unwanted plant growth, which comprises applying an herbicidal effective amount of the composition as defined in claim 2 to plants, parts of plants or a cultivation area.

33. A method of (i) increasing the herbicidal activity of a composition comprising one or more herbicides selected from the group consisting of glufosinate and salts thereof, glyphosate and salts thereof, and auxin herbicides and salts thereof, and/or (11 reducing the volatility of a composition comprising one or more herbicides selected from the group consisting of auxin herbicides salts, compared to an otherwise identical composition without benazolin-choline when tested under the same conditions, wherein the method comprises mixing the composition according to claim 2 with one or more of the said herbicides.

* * * * *